United States Patent
Blundell et al.

(10) Patent No.: US 7,532,966 B2
(45) Date of Patent: May 12, 2009

(54) TORQUE STEER COMPENSATION ALGORITHM

(75) Inventors: Stacey M. Blundell, Markham (CA); Norman Joseph Weigert, Whitby (CA); Rodney A. D. Jones, Toronto (CA); Paul S. Shaub, Detroit, MI (US)

(73) Assignee: General Motors Corporation, Detroit, MI (US)

( * ) Notice: Subject to any disclaimer, the term of this patent is extended or adjusted under 35 U.S.C. 154(b) by 187 days.

(21) Appl. No.: 10/922,773

(22) Filed: Aug. 20, 2004

(65) Prior Publication Data

US 2006/0041355 A1 Feb. 23, 2006

(51) Int. Cl.
*G06F 19/00* (2006.01)
*B62D 6/00* (2006.01)

(52) U.S. Cl. ............... 701/41; 701/36; 701/42; 701/43; 701/84; 701/85; 701/86; 180/400; 180/443

(58) Field of Classification Search ............... 701/36, 701/41–43, 84–86; 180/400, 443
See application file for complete search history.

(56) References Cited

U.S. PATENT DOCUMENTS

| | | | | |
|---|---|---|---|---|
| 5,198,981 A * | 3/1993 | Collier-Hallman et al. .... | 701/42 |
| 5,541,841 A * | 7/1996 | Tanaka ......................... | 701/41 |
| 5,568,389 A * | 10/1996 | McLaughlin et al. .......... | 701/41 |
| 5,623,409 A * | 4/1997 | Miller ........................... | 701/41 |
| 5,845,222 A * | 12/1998 | Yamamoto et al. ............ | 701/41 |
| 6,032,755 A | 3/2000 | Blandino et al. ............. | 180/446 |
| 6,148,949 A * | 11/2000 | Kobayashi et al. ........... | 180/446 |
| 6,415,212 B2 * | 7/2002 | Nishizaki et al. .............. | 701/41 |
| 6,445,987 B1 * | 9/2002 | Kurishige et al. ............. | 701/41 |
| 6,499,559 B2 * | 12/2002 | Mc Cann et al. ............. | 180/446 |
| 6,505,702 B1 | 1/2003 | Shinmura et al. ............ | 180/446 |
| 6,591,937 B2 | 7/2003 | Badenoch et al. ............ | 180/446 |
| 6,637,544 B2 * | 10/2003 | Stevens et al. ............... | 180/446 |
| 6,661,191 B2 * | 12/2003 | Zheng et al. ................. | 318/434 |
| 6,943,512 B2 * | 9/2005 | Kobayashi ................... | 318/432 |
| 2004/0148080 A1 * | 7/2004 | Ekmark et al. ................. | 701/41 |

* cited by examiner

*Primary Examiner*—Jack W. Keith
*Assistant Examiner*—Chuong Nguyen

(57) ABSTRACT

A torque steer compensation algorithm utilizing selected vehicle parameters, such as for example engine torque, accelerator pedal position, throttle position, transmission gear, and vehicle speed. Rates of change of the parameters are determined and compared to predetermined thresholds, whereby a torque steer factor is determined. The resulting torque steer factor is subsequently multiplied with a conventional, prior art predicted steering assist signal to arrive at a modified steering assist signal which is output to the coil of the steering column to reduce driver perception of torque steer at the steering wheel.

2 Claims, 3 Drawing Sheets

TORQUE STEER COMPENSATION ALGORITHM

TECHNICAL FIELD

The present invention relates to motor vehicle power steering systems and, more particularly, to torque steer associated with motor vehicle power steering systems

BACKGROUND OF THE INVENTION

Torque steer experienced by a vehicle driver can be measured by the amount of steering pull, or steering wheel angle change, experienced by a driver independent of the driver's input on the steering wheel. Torque steer is usually experienced in dynamic situations in which a motor vehicle is undergoing acceleration, whether from zero speed, from a slightly higher cruising speed, or even from a much higher cruising speed, depending on the severity of the causation. The causes of torque steer vary greatly, anywhere from unequal length half-shafts, to variations in chassis, suspension or powertrain component/subsystem design, or variations in manufacture and assembly. The appearance of noticeable torque steer ultimately results in driver dissatisfaction.

FIG. 1 depicts a conventional, prior art power steering system 100 utilized on motor vehicles equipped with variable effort steering. At Block 102, input are steering assist parameters 102, at least, for example, vehicle speed, which are then supplied to a power steering assist controller 104, the controller commonly being associated with an hydraulic steering assist. The controller 104 then predicts, through a predetermined electronic routine, the amount of steering assist to supply to a power steering column 110 via a coil 108 on the power steering column by generating a steering assist signal 106. The power steering column 110 is directly connected to the vehicle steering wheel 112, whereat the driver inputs his/her vehicle turning commands into the power steering column.

For example, at high vehicle cruising speeds, the power steering assist controller 104 decreases steering assist via the steering assist signal 106 to the coil 108, resulting in a stiffer steering wheel rotation as felt by the driver as the driver rotates the steering wheel 112 incorporated in power steering column 10. Whereas at zero, or low, vehicle speeds, the power steering assist controller 104 increases steering assist via the steering assist signal 106 to the coil 108 resulting in a looser steering wheel rotation as felt by the driver as the driver rotates the steering wheel 112.

Existing conventional methods of correcting torque steer on (hydraulic) power steered motor vehicles equipped with variable effort steering can be quite costly, as for example, intermediate driveshafts, modifying engine mounting technology/methods, modifying chassis or suspension design and manufacturing. Examples of methods of torque steer are outlined in U.S. Pat. Nos. 6,032,755; 6,505,702; and 6,591,937.

Accordingly, what is needed in the art is a simpler, cost effective method for addressing torque steer on (hydraulic) power assist steered motor vehicles equipped with any form of variable effort steering

SUMMARY OF THE INVENTION

The present invention is a torque steer compensation algorithm whose output is utilized to modify the predicted steering assist of a conventional power steering assist system to reduce torque steer as perceived by the driver at the steering wheel.

The torque steer compensation algorithm according to the present invention is based upon the principle that applying steering assist will reduce the torque steer translated through the vehicle chassis and suspension components to the steering wheel, as this is perceived by the driver. In this regard, torque steer perceived by the driver is based on starting speed and also on driver requested and actual engine output. The output of the torque steer compensation algorithm is a torque steer factor whose value is at least one, which is multiplied with the predicted conventional, prior art power steering system steering assist signal to arrive at a modified steering assist signal to reduce torque steer.

The torque steer compensation algorithm according to the present invention utilizes parameters, such as for example engine torque, accelerator pedal position, throttle position, transmission gear, and vehicle speed, which information is available, for example, from the engine controller or other controllers within the motor vehicle, as well as from calibration constants stored in memory specifically previously calculated and calibrated for the specific motor vehicle application in which the algorithm is utilized. Rates of change of various parameters are determined and compared to predetermined thresholds, whereby a torque steer factor is determined. The resulting torque steer factor is subsequently multiplied with the conventional, prior art predicted steering assist signal to arrive at a modified steering assist signal which is output to the coil of the steering column to reduce driver perception of torque steer at the steering wheel.

Accordingly, it is an object of the present invention to provide a torque steer compensation algorithm for a motor vehicle power steering system which selectively modifies conventionally predicted steering assist of the power steering system based upon predetermined parameters, whereby driver perception of torque steer is reduced.

This and additional objects, features and advantages of the present invention will become clearer from the following specification of a preferred embodiment.

DESCRIPTION OF THE PREFERRED EMBODIMENT

Figure 2:
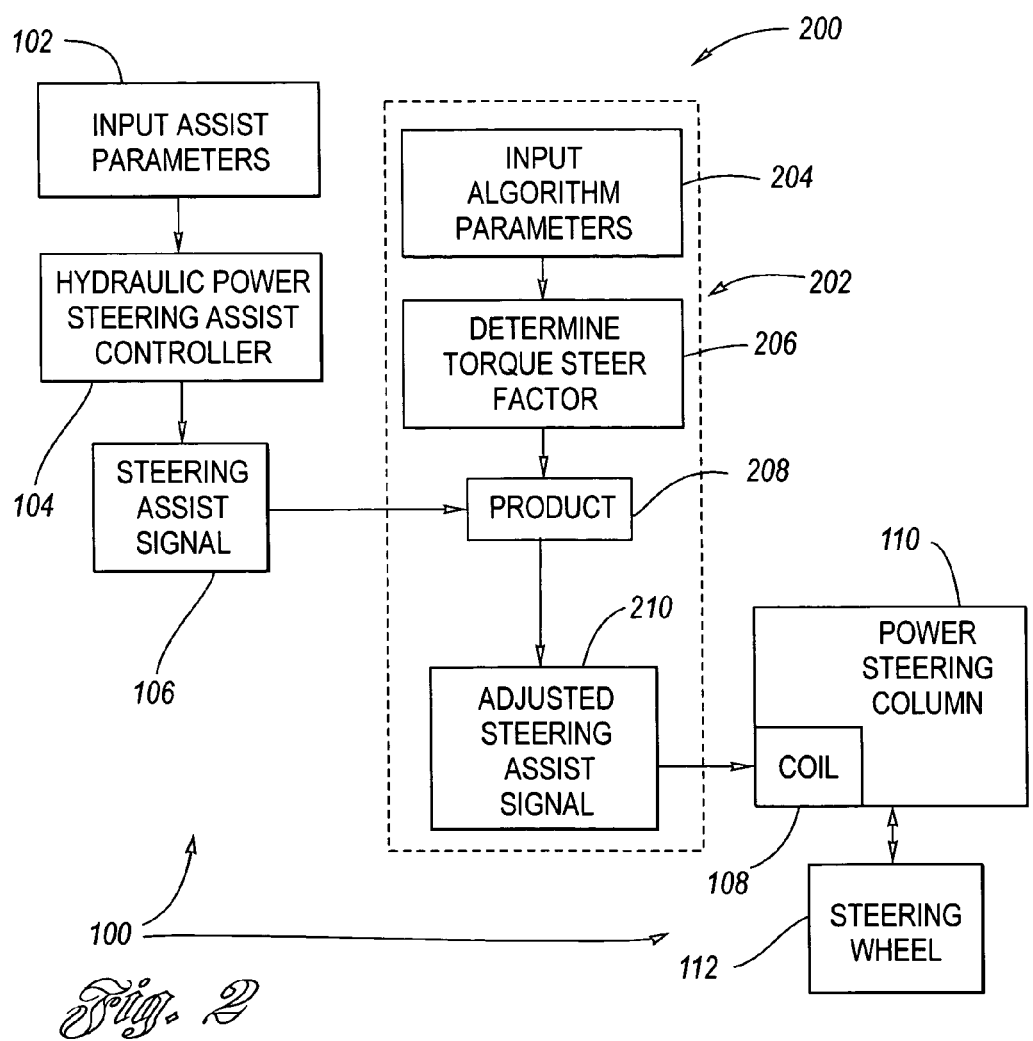
FIG. 2 depicts a schematic representation of the power steering system of FIG. 1, now incorporating the torque steer compensation algorithm according to the present invention.
Figure 3A:
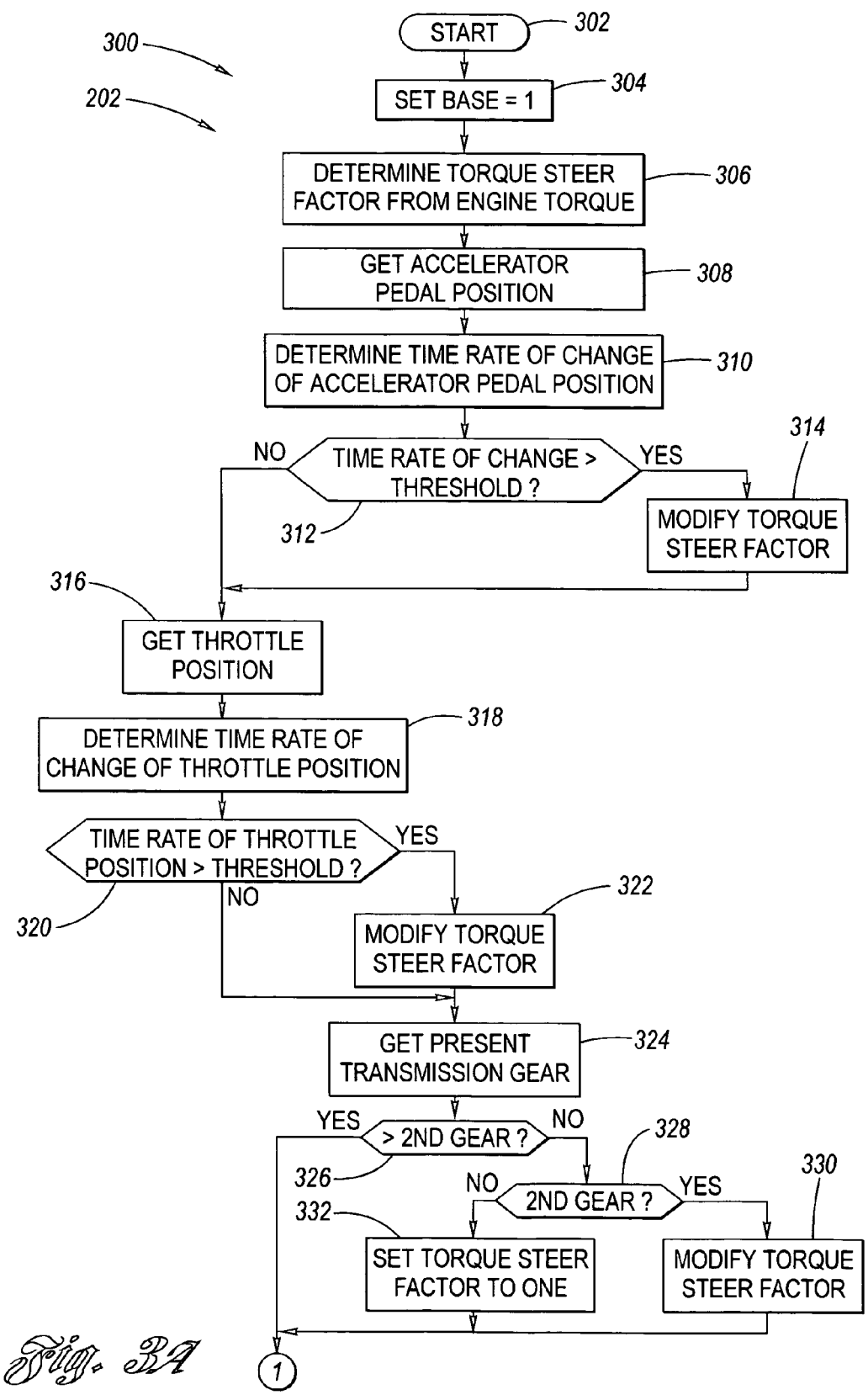
FIGS. 3A and 3B collectively depict a block diagram of the torque steer compensation algorithm according to the present invention.
Figure 3B:
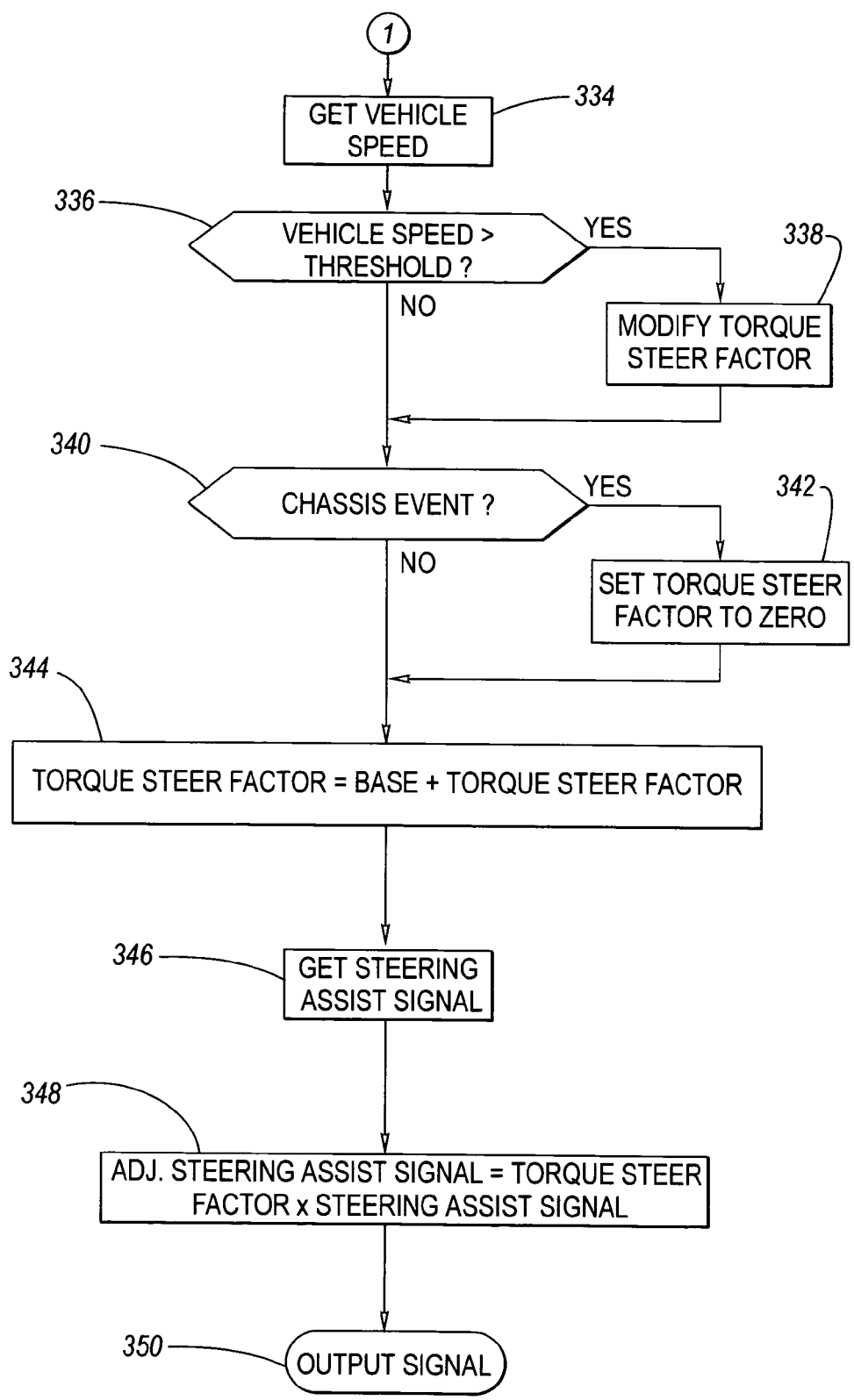

Referring now to the Drawing, wherein like reference numerals refer to like parts throughout the several views, FIGS. 2 through 3B depict aspects of a torque steer compensation algorithm 202, 300 according to the present invention.

Figure 1:
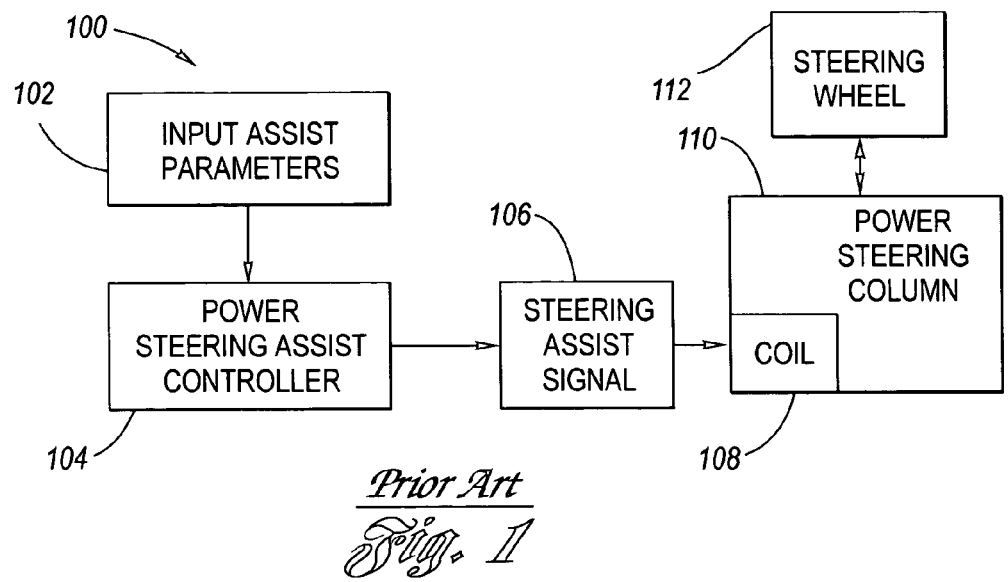
FIG. 1 depicts a schematic representation of a conventional, prior art motor vehicle power steering system.

FIG. 2 depicts a power steering system 200 (commonly hydraulically based) on vehicles equipped with variable effort steering incorporating a prior art power steering system 100 and a torque steer compensation algorithm 202 according to the present invention. As discussed hereinabove with regard to FIG. 1, at Block 102, input are steering assist parameters, at least, for example, vehicle speed, which are then supplied to a conventional hydraulic power steering assist controller 104 which predicts the amount of steering assist signal to be sent to the coil 108 of the power steering column 110, according to the prior art as discussed above.

The torque steer compensation algorithm 202 according to the present invention, at Block 204, inputs torque steer compensation algorithm parameters to determine a torque steer factor at Block 206, wherein the nature of these parameters will be described in detail hereinbelow. The torque steer factor determined at Block 206 is multiplied at Block 208 with the prior art predicted steering assist signal from Block 104, resulting in a modified steering assist signal at Block 210. The modified steering assist signal is output from Block 210 to supply to the coil 108 the appropriate steering assist signal at the power steering column 110 such that the driver perception of torque steer at the steering wheel 112 is reduced. The torque steer factor determined at Block 206 has, at least, a value of one and, generally, a value between one and eleven.

FIG. 3 is a block diagram 300 of the above described torque steer compensation algorithm 202 according to the present invention.

Control is passed to the torque steer compensation algorithm 202 at Block 302 by, for example, the engine controller. Control then passes to Block 304 whereat a variable called "Base" is initialized to a value of one after which control passes to Block 306. At Block 306 torque steer factor Y is determined from the equation:

$$Y=a(X)^2+b(X)+c \quad (1)$$

where X represents engine torque, available to torque steer compensation algorithm 202 from, for example, the engine controller or stored in microprocessor memory utilized by the engine controller or other vehicle controllers. Constants a, b, and c in equation (1) are previously determined, for example, empirically, for a specific vehicle line and are stored in, for example, microprocessor memory. Alternately, Block 306 may be implemented using a look-up table of predetermined data of the relationship between engine torque and intended steering assist correction which data is stored in microprocessor memory, or implemented by a piecewise linear mathematical relationship, or other suitable mathematical relationship, relating engine torque to intended steering assist correction.

Control passes from Block 306 to Block 308, whereat accelerator pedal position is obtained from, for example, the engine controller or stored in microprocessor memory utilized by the engine controller or other vehicle controllers. At Block 310 the time rate of change of accelerator pedal position is determined from, for example, sequential accelerator pedal positions and the elapsed time between said positions or, for example, as a previously determined variable stored in microprocessor memory. Control then passes to Block 312, whereat the time rate of change of accelerator pedal position is compared to a predetermined threshold. If the time rate of change of accelerator pedal position is greater than the previously determined threshold, control then passes to Block 314, whereat the torque steer factor Y is modified by:

$$Y=K(Y) \quad (2)$$

where a "Stomped Accelerator Calibration" parameter K, available from, for example, the engine controller or stored in microprocessor memory utilized by the engine controller or other vehicle controllers, has been previously determined for a specific vehicle line. Control then passes to Block 316. But, if at Block 312 the time rate of change of accelerator pedal position is not greater than the previously determined threshold, then control passes directly to Block 316.

At Block 316 throttle position is obtained from, for example, the engine controller or stored in microprocessor memory utilized by the engine controller or other vehicle controllers. At Block 318, the time rate of change of throttle position is determined from, for example, sequential throttle positions and the elapsed time between said positions or, for example, as a previously determined variable stored in microprocessor memory. Control then passes to Block 320, whereat the time rate of change of throttle position is compared to a predetermined threshold. If the time rate of change of throttle position is greater than the previously determined threshold, then control passes to Block 322, whereat the torque steer factor Y is modified by:

$$Y=L(Y) \quad (3)$$

where an "Open Throttle Calibration" parameter L, available from, for example, the engine controller or stored in microprocessor memory utilized by the engine controller or other vehicle controllers, has been previously determined for a specific vehicle line. Control then passes to Block 324. But, if at Block 320 the time rate of change of throttle position is not greater than the previously determined threshold, then control passes directly to Block 324.

At Block 324 the present transmission gear is obtained from, for example, the engine controller or stored in microprocessor memory utilized by the engine controller or other vehicle controllers after which control passes to Block 326. At Block 326, if the transmission gear is greater than second gear then control passes directly to Block 334. Otherwise, control passes to Block 328. At Block 328, if the transmission gear is second gear, control passes to Block 330, whereat the torque steer factor Y is modified by:

$$Y=M(Y) \quad (4)$$

where a "Reduce for Gear Calibration" parameter M, available from, for example, the engine controller or stored in microprocessor memory utilized by the engine controller or other vehicle controllers, has been previously determined for a specific vehicle line. Control then passes to Block 334. However, at Block 328 if the transmission gear is not second gear, then control passes to Block 332 whereat torque steer factor Y is set equal to one. Control then passes to Block 334.

At Block 334, vehicle speed is obtained from, for example, the engine controller or stored in microprocessor memory utilized by the engine controller or other vehicle controllers. Control then passes to Block 336 whereat vehicle speed is compared to a predetermined threshold. If vehicle speed is greater than the previously determined threshold, then control passes to Block 338, whereat the torque steer factor Y is modified by:

$$Y=N(Y) \quad (5)$$

where a "Speed Calibration" parameter N, available from, for example, the engine controller or stored in microprocessor memory utilized by the engine controller or other vehicle controllers, has been previously determined for a specific vehicle line. Control then passes to Block 340. However, at Block 336 if vehicle speed is not greater than the previously determined threshold, then control passes directly to Block 340.

At Block 340, if a chassis event has occurred, control passes to Block 342, whereat the torque steer factor is set equal to zero and control passes to Block 344. Otherwise, control passes directly to Block 344. A chassis event, for example rough road information or vehicle stability information, is available from, for example, the chassis controller, the engine controller or stored in microprocessor memory utilized by the engine controller or other vehicle controllers.

At Block 344, a final torque steer factor Y is obtained by adding the variable "Base" of Block 304 to the torque steer factor Y:

$$Y=Y+\text{Base}. \quad (6)$$

Control then passes to Block 346 whereat the prior art power steering system steering assist signal from Block 106 is input. Control then passes to Block 348, whereat, the torque steer compensation algorithm 202 provides an adjusted steering assist signal by multiplying the torque steer factor Y of Block 344 (also Block 208 of FIG. 2) with the prior art (conventional) power steering system steering assist signal from Block 106, to provide the adjusted steering assist signal as previously mentioned regarding Block 210 of FIG. 2, which signal is then output at Block 350 to the coil 108 of the power steering column 110.

Table I represents, merely by way of an instructive hypothetical example, an indication of values provided in the course of execution of the torque steer compensation algorithm 202 according to the present invention.

TABLE I

| | |
|---|---|
| Conventional Steering Assist Signal (at Block 106) | 1.24 volts |
| Base | 1 |
| Eq. (1): Y = .00005(180)² + −.001(180) + 0 | 1.44 |
| Eq. (2): Y = (1.3)1.44 | 1.872 |
| Eq. (3): Y = 1.1(1.872) | 2.0592 |
| Eq. (4): Y = .5(2.0592) | 1.0296 |
| Eq. (5): Y = .9(1.0296) | 0.92667 |
| Eq. (6): Y = 1 + .92667 | 1.92667 |
| Adjusted Steering Assist Signal (at Block 210) | 2.389 volts |

Table I notes:
The output of the prior art power steering system 100 outputs a steering assist signal of, by way of example, 1.24 volts at Block 106.
Eq. (1): The exemplary scenario involves a driver accelerating rather rapidly, so that the engine is generating a high torque. For a V6 engine, this torque is by example, 180 foot-pounds; therefore, X is, by example, equal to 180. Constant a is, by example, equal to 0.00005 and constant b is, by example, equal to −0.001, and constant c is, by example equal to zero. Accordingly, the first iteration of Y is calculated in this example to be 1.44.
Eq. (2): The driver, by example, is still depressing the accelerator pedal, giving, by example K equal to 1.3. Accordingly, the second iteration of Y is calculated in this example to be 1.872.
Eq. (3): The depression of the accelerator pedal will usually, depending on latency, provide a throttle increase, giving, by way of example L equal to 1.1. Accordingly, the third iteration of Y is calculated in this example to be 2.0592.
Eq. (4): By way of example, the driver has placed the motor vehicle in second gear, in which case, M would be, by example, equal to 0.5. (By comparison if gear was third, M, by example, would be zero, and if gear was first, M, by example, would be one). Accordingly, the fourth iteration of Y is calculated in this example to be 1.0296.
Eq. (5): By way of example, the motor vehicle has a speed which is above a 7 kilometers per hour threshold, giving, by example, N equal to 0.9. Accordingly, the fifth iteration of Y is calculated in this example to be 0.92667.
Eq. (6): The result of Equation 5 is added to the Base to yield a final and sixth iteration of Y, wherein in this example Y equals 1.92667.
At Block 210 an adjusted steering assist signal is output, which, per this example, is equal to the final iteration of Y times the prior art power steering system steering assist signal of Block 106; wherein, in this example, the adjusted steering assist signal is equal to 2.389 volts. This voltage is output to the coil 108, with the proviso that safety circuits permit the higher voltage.

To those skilled in the art to which this invention appertains, the above described preferred embodiment may be subject to change or modification. Such change or modification can be carried out without departing from the scope of the invention, which is intended to be limited only by the scope of the appended claims.

The invention claimed is:

1. A method for compensating torque steer appearing at the steering wheel of motor vehicles equipped with a power steering system, said method consisting of the steps of:
providing a power steering assist signal, wherein said power steering assist signal comprises a signal which operates the power steering system;
obtaining a plurality of predetermined vehicle parameters comprising: engine torque information; accelerator pedal information; throttle information; transmission gear information; vehicle speed information; and chassis event information;
providing an initial torque steer factor;
evaluating each of the parameters for its respective affect on the torque steer factor;
modifying the torque steer factor responsive to said step of evaluating to thereby provide a modified torque steer factor, wherein said modified torque steer factor has a value of at least one;
multiplying the modified torque steer factor by the power steering assist signal to thereby arrive at an adjusted power steering assist signal; and
sending the adjusted power steering assist signal free of further modification after said step of multiplying to the power steering system, wherein the power steering system directly utilizes the adjusted power steering signal to thereby provide steering assist with reduced torque steer appearing at the steering wheel.

2. A method for compensating torque steer appearing at the steering wheel of motor vehicles equipped with a power steering system, said method comprising the steps of:
providing a power steering assist signal;
obtaining a plurality of predetermined vehicle parameters comprising: engine torque information; accelerator pedal information; throttle information; transmission gear information;
vehicle speed information; and chassis event information;
providing an initial torque steer factor;
evaluating each of the parameters for its respective affect on the torque steer factor;
modifying the torque steer factor responsive to said step of evaluating to thereby provide a modified torque steer factor;
multiplying the modified torque steer factor by the power steering assist signal to thereby arrive at an adjusted power steering assist signal; and
sending the adjusted power steering assist signal to the power steering system, wherein the power steering system directly utilizes the adjusted power steering signal to thereby provide steering assist with reduced torque steer appearing at the steering wheel;
wherein said step of providing an initial torque steer factor, comprises:
the torque steer factor, Y, being derived from the relation $Y=a(X)^2+b(X)+c$, wherein X is a variable representing engine torque and a, b and c are predetermined constants; and
said steps of evaluating and modifying comprise:
setting a base equal to one;
determining if a time rate of change of accelerator pedal position exceeds a predetermined threshold, and if so, modifying the torque steer factor by Y=K(Y), wherein K is a predetermined parameter applicable to a specific vehicle;
determining if a time rate of change of throttle position exceeds a predetermined threshold, and if so, modifying the torque steer factor by Y=L(Y), wherein L is a predetermined parameter applicable to a specific vehicle;
determining transmission gear, wherein if the transmission gear is second gear, then modifying the torque steer factor by Y=M(Y), wherein M is a predetermined parameter applicable to a specific vehicle, and wherein if the transmission gear is less than second gear, then modifying the torque steer factor by setting Y equal to one;

determining if vehicle speed exceeds a predetermined threshold, and if so, modifying the torque steer factor by Y=N(Y), wherein N is a predetermined parameter applicable to a specific vehicle;

determining if a chassis event is occurring, and if so, then modifying the torque steer factor by setting Y equal to zero; and adding a resultant torque steer factor that has been obtained by sequentially performing said steps of determining with the base to obtain the modified torque steer factor.

* * * * *